April 2, 1929.    J. F. O'CONNOR    1,707,765
SHOCK ABSORBING MECHANISM FOR VEHICLES
Filed Nov. 12, 1926
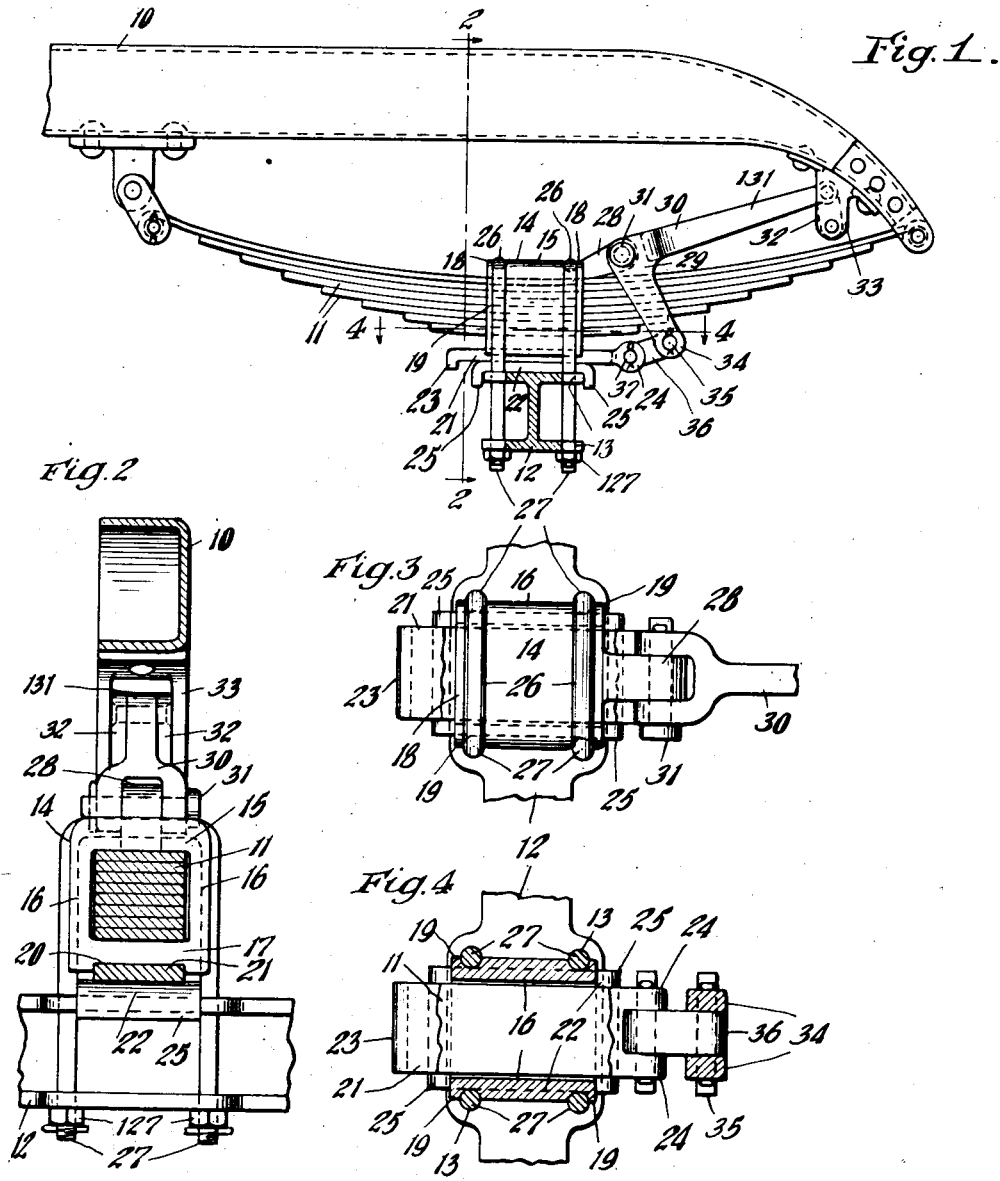
Witness
Wm. Geiger
Inventor
John F. O'Connor
By George I. Haight
His Atty.

Patented Apr. 2, 1929.

1,707,765

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK-ABSORBING MECHANISM FOR VEHICLES.

Application filed November 12, 1926. Serial No. 147,900.

This invention relates to shock absorbing mechanisms for vehicles.

An object of the invention is to provide a shock absorbing mechanism to be used in conjunction with vehicles, more particularly of the bus type, wherein the shock absorbing means is interposed between the usual axle member of the vehicle and the chassis, and operates to supplement the absorbing qualities of the usual springs which support the vehicle upon the axle.

A more particular object of the invention is to provide a shock absorbing mechanism including a friction element which is arranged between the usual spring member and the axle of the vehicle, so as to transmit the weight imposed on the spring to the element, together with means which reciprocate the friction element upon relative movement in opposite directions of the axle with reference to the chassis.

Other and further objects of the invention will more clearly appear from the description and claims hereinafter following.

In the drawings, forming a part of this specification, Figure 1 is a side elevational view of a fragment of the chassis of a vehicle, together with the spring and axle, and showing the invention applied in connection therewith. Figure 2 is a transverse vertical sectional view of the invention on a line substantially corresponding to the line 2—2 of Figure 1. Figure 3 is a top plan view of the invention, showing fragments of the axle, and portions of the actuating mechanism. And Figure 4 is a horizontal sectional view corresponding substantially to line 4—4 of Figure 1, and showing parts of the mechanism in top plan.

Referring more particularly to the drawings, 10 represents the forward portion of one side frame of a vehicle, and 11 shows a plurality of leaf springs, the uppermost of which is connected to the frame member 10 by suitable connections in any well known manner.

The axle of the vehicle is indicated at 12, and preferably is in the form of an I-beam as of a character commonly used, the flanges of the I-beam being provided with holes 13—13 for co-operation with the mechanism hereinafter described.

In carrying out the invention there is provided a casing 14 which surrounds the spring assembly 11 at a central point, and is adapted to maintain the leaves of the spring in assembled position. The casing comprises top, side and bottom walls 15, 16—16 and 17, respectively. The top wall 15 is provided with transversely extending flanges 18—18 adjacent each end thereof, said flanges extending downwardly upon the opposite ends of the side walls 16—16, as indicated at 19. The lower wall 17 of the casing 14 is provided with a groove 20, the inner surface of which forms a friction surface for co-operation with a friction element or member 21, said friction member bearing upon a friction plate 22 mounted on the axle 12. The friction member 21 is elongated in form, and flat in cross section, and one end of said member is provided with a turned portion 23 to form a stop. The opposite end of the friction member 21 is provided with a pair of spaced eyelets 24—24 which are utilized for connection with actuating mechanism hereinafter described. The plate 22 is provided with end flanges 25—25 adapted to abut the opposite side flanges of the axle 12 to prevent movement of said plate transversely with respect to the axle 12. The casing 14, the friction member 21, and the plate 22, are held in operative position by means of two U-shaped members 26—26, each of which is disposed upon the inner sides of the flanges 18 and 19, and the legs 27—27 of which extend downwardly into the holes 13—13 formed in the flanges at the opposite sides of the axle 12, and the ends of each of the legs 27—27 has a nut 127 thereon which bears against the undersurface of the axle 12 and maintains the parts against displacement vertically with reference to the axle 12 as well as horizontally with respect to said axle, the arrangement being such that no additional pressure, in excess of the weight of the superstructure, is added to the element 21, through tension on U bolts. Adjustment is sufficient to prevent any lost motion only.

Preferably formed integrally with the upper portion of the casing 14 is a bracket 28, upon which is pivotally mounted the elbow 29 of a bell crank lever 30, by means of the pivot pin 31. The bell crank lever 30 is provided with a relatively long arm 131, the free end of which is pivotally connected to links 32—32, which link in turn is pivotally connected to a bracket 33 which is riveted to the frame member 10 adjacent the forward end thereof. The other arm 34 of the bell crank lever is preferably considerably shorter than the arm 31, and the arm 34 has its free end pivotally connected as indicated at 35, with a link 36 which is pivotally connected, as indicated at 37, between the ears 24—24 of the friction member 21.

In operation of the device, the weight of the vehicle is supported by the spring assembly 11, which bears upon the top surface of the friction member 21, and the weight is finally supported by the friction member upon the plate 22 which is carried by the axle 12. The casing 14, the friction member 21, and the plate 22 are held in position by the U-shaped members co-operating with the flanges upon the casing, and by means of the connection of the U-shaped members with the axle 12.

Upon relative approach of the axle member 12 and the frame member 10, movement is imparted to the bell crank lever in a clockwise direction, and through the connection of the arm 34 of the lever with the link 35, which in turn is connected to the friction member 21, longitudinal reciprocation of the friction member 21 toward the left as viewed in Figure 1 is brought about, movement of the friction member, of course, being powerfully resisted by reason of the engagement of the friction surfaces of the under-surface of the casing 14, and the upper surface of the plate 22, which are urged into engagement with the friction member 21 by reason of the weight of the vehicle being supported thereon. The frictional resistance developed to the movement of the member 21 aids the spring assembly 11 in absorbing shocks in a simple and effective manner. Upon return of the spring assembly 11 and the frame member 10 to their normal positions, the friction member 21 is reciprocated in the opposite direction, developing frictional resistance to the return of said members to normal position. Upon separation of the spring assembly 11 and the frame member 10 beyond normal position, the bell crank lever 30 of course is initially moved in a counter-clockwise direction, and reciprocates the friction member 21 in a forward direction, thereby developing resistance to such movement, which resistance of course is also active when the parts return to normal position.

By the above described arrangement it will be appreciated that the weight of the vehicle is utilized for developing the frictional resistance to the movement of the friction member, in a simple and effective manner.

While I have herein shown and described what I consider the preferred manner in carrying out the invention, the same is merely illustrative, and I contemplate all changes and modifications which come within the scope of the claims appended hereto.

I claim:

1. In a device of the character described, the combination with a frame member and an axle member; of an assembly of leaf springs; means for connecting said assembly to said frame member; of means for holding said leaf springs in assembled relation, said means being provided with friction surfaces; a friction plate connected to said axle; a friction element movably disposed between said holding means and said plate; mechanism for connecting said holding means with said axle member; and means operable by relative movement between said axle member and said frame member for imparting reciprocation to said friction element.

2. In a device of the character described, the combination with a frame member and an axle member; of a plurality of leaf springs, the uppermost of which has its opposite ends movably secured to said frame member; a casing surrounding the plurality of leaf springs at an intermediate point for holding the same in assembled relation, said casing being provided with transversely extending flanges adjacent its opposite ends, and the lower surface of said casing being provided with a channel; a plate resting on the upper surface of said axle member and provided with turned flanges to prevent relative movement of said plate transversely of said axle member; an elongated friction member disposed in the channel of said casing and bearing upon said casing and said plate, said member being provided with an angular flange to limit its movement in one direction; U-shaped members disposed upon the inner sides of the flanges on said casing and extending to opposite sides of said axle member and connected thereto; and a bell crank lever having its elbow pivotally connected to said casing, and having one arm connected to said frame member and the other arm pivotally movably connected to said friction element.

3. In a shock absorbing device for vehicles, including a vehicle body, an axle member and leaf spring means interposed between the body and axle member for yieldingly supporting the car, said leaf spring having its opposite ends attached to the body and supported between the ends on said axle member, the combination with relatively movable friction elements below said spring means interposed between said spring means and said axle member; of means for effecting relative movement between said friction elements upon relative movement of said body and axle toward and away from each other, including a bell crank lever having the outer end of one arm thereof pivoted to said frame member by means of link connection and having the elbow portion thereof pivoted above said leaf spring means to a support mounted on the axle and having the outer end of the other arm connected to one of said friction elements, said last named arm extending clear of said leaf spring means.

In witness that I claim the foregoing I have hereunto subscribed my name this 8th day of November, 1926.

JOHN F. O'CONNOR.